(12) United States Patent
Zhang et al.

(10) Patent No.: US 9,760,475 B2
(45) Date of Patent: Sep. 12, 2017

(54) AUTOMATIC UPDATING OF GRAPHICAL USER INTERFACE ELEMENT LOCATORS BASED ON IMAGE COMPARISON

(71) Applicant: VMware, Inc., Palo Alto, CA (US)

(72) Inventors: Michael Zhang, Shanghai (CN); Benniu Ji, Shanghai (CN); Jing Gong, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 306 days.

(21) Appl. No.: 14/310,171

(22) Filed: Jun. 20, 2014

(65) Prior Publication Data
US 2015/0370694 A1    Dec. 24, 2015

(51) Int. Cl.
*G06F 17/00* (2006.01)
*G06F 11/36* (2006.01)

(52) U.S. Cl.
CPC ............................... *G06F 11/3688* (2013.01)

(58) Field of Classification Search
CPC ..................... G06F 11/3692; G06F 11/3688
See application file for complete search history.

(56) References Cited

U.S. PATENT DOCUMENTS

| 9,519,570 B2 | 12/2016 | Srinivasan |
| 2015/0254169 A1* | 9/2015 | Gillaspie ............ G06F 11/3688 714/38.1 |

* cited by examiner

*Primary Examiner* — Haoshian Shih

(57) ABSTRACT

An automated testing system is described for efficient testing of software applications. Locators are used by the test to find user interface elements in an application's graphical user interface during testing. If during a test a user interface element is not found, which may be due to a changed locator during code refactoring, the system finds the user interface element based on the element's type and on previously stored information about the element. Such information can be a snapshot image of the element, the coordinates of the element's location, dimensions of the element, or other information. Once the missing element is found, a new locator for the element is read and the test is performed using the new locator.

20 Claims, 6 Drawing Sheets

AUTOMATIC UPDATING OF GRAPHICAL USER INTERFACE ELEMENT LOCATORS BASED ON IMAGE COMPARISON

RELATED APPLICATIONS

This application is related to U.S. patent application Ser. No. 14/310,202, entitled AUTOMATIC UPDATING OF GRAPHICAL USER INTERFACE ELEMENT LOCATORS BASED ON DIMENSION COMPARISON by Michael Zhang et al., filed on the same date as the present application, which is incorporated by reference in its entirety herein.

TECHNICAL FIELD

The present disclosure generally relates to techniques for automated testing of software and more specifically to locators corresponding to user interface elements.

BACKGROUND

Efficient testing of software presents one of the biggest challenges for software developers today. As computers and the Internet continue to form the backbone of modern business, commerce, and communication, the importance of having reliable, consistent software has become increasingly more and more critical. Particularly for businesses, errors and bugs in software can lead to losses in revenue, customer dissatisfaction, liability, and other problems. To avoid such issues, developers of software applications, whether hosted on personal computers or on websites, must put the applications through thorough testing before deploying them to users.

Automated testing software makes the process of software testing more efficient and reliable. Such software contains instructions that test software by performing various operations on the software and check for successful execution. Hence, instead of an individual testing out each function of an application manually, the automated testing software can be executed on the application to automatically test the functions, saving valuable time and cost in manual labor.

However, many issues still persist. For example, when an application's code is refactored, which is common for many types of applications, such as websites, locators corresponding to user interface elements in the application may be changed. Because automated testing software may rely on locators to identify user interface elements in the application's user interface during testing, the test may fail after such refactoring. Accordingly, automated testing software may need to be updated to ensure that locators are accurate after code is refactored. Producing such updates on the automated testing software manually is burdensome, inefficient, and costly. To compound these difficulties, software applications are becoming larger and more complex, and rapidly evolving business and technology environments require ongoing code refactoring to deliver updates and fixes. As a result, software testing and maintaining properly functioning automated testing software for constantly evolving code presents a formidable task for software developers. A more efficient approach is desirable for automated software testing.

DETAILED DESCRIPTION

Figure 1:
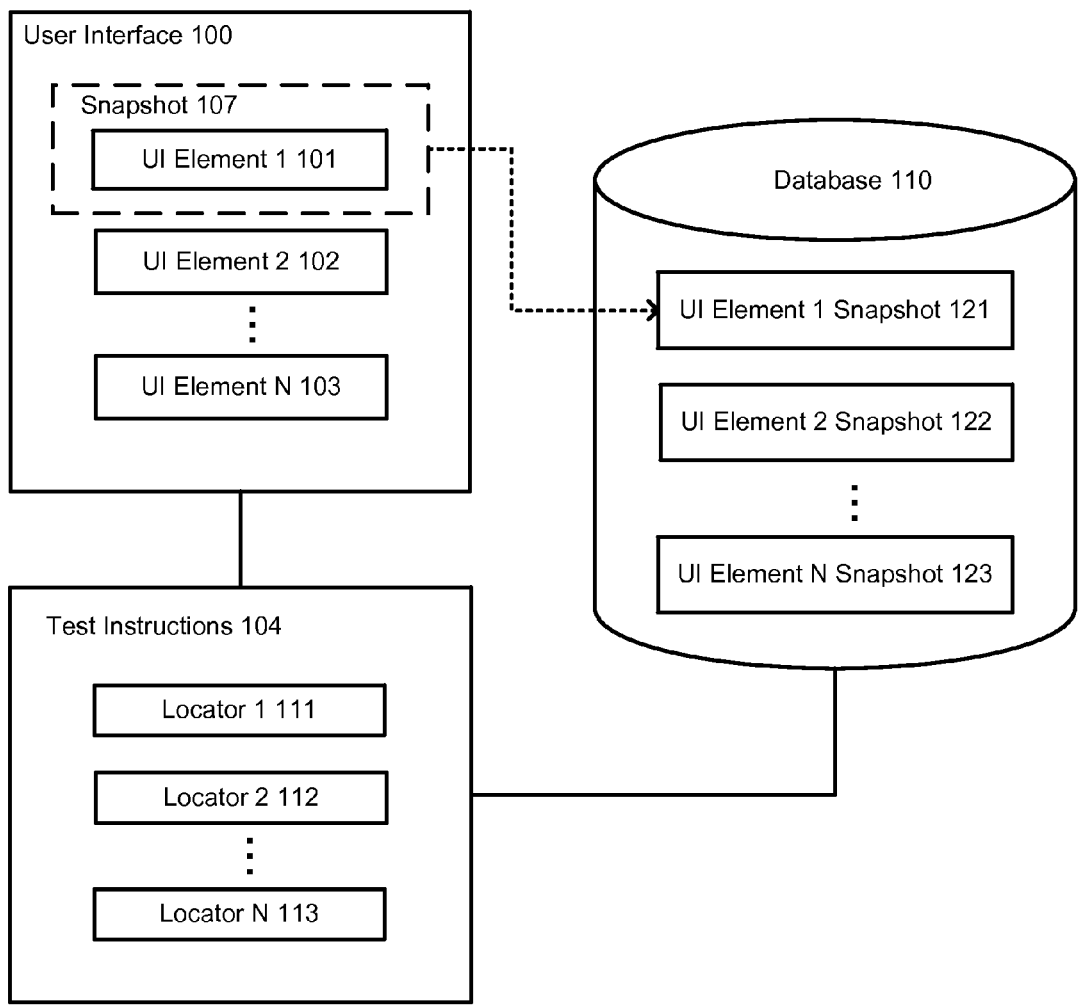
FIG. 1 illustrates an example of an automated software test system implementing image comparison, in accordance with various embodiments.

Systems and methods in accordance with various embodiments of the present disclosure overcome at least some of the above mentioned shortcomings and deficiencies by providing more efficient ways to perform automated software testing. In particular, embodiments described herein improve the efficiency of performing automated testing on software in contexts where code is refactored or changed.

The system comprises a computing device running an application, which can be a program, website, or any software application that can be executed on a computing device. An automated test can be executed on the application to test the application. For example, such a test can contain a test script or any computer instructions that perform test operations on the application. In various embodiments, the test can execute various functions on the application and check for successful execution. For example, to test a website, the test can simulate a user clicking buttons, making selections in menus, entering search terms into a search engine, or performing any other operations allowed by the website, and check that the website performed the correct corresponding operations and delivered appropriate results.

In various embodiments, a test locates a user interface element (UI element), such as a button, menu, text input box, etc. in the graphical user interface (UI) of the application based on a locator associated with the UI element. A locator can be any identifier that is used to locate a UI element in the application or that tells the test how to find the UI element. However, if the locator of the application is changed, such as when the application's code is refactored, updated, or otherwise modified, the test may not be able to locate the UI element due to the changed locator. For example, in a web based system, there is often a lot of code refactoring, which causes the locators of UI elements to change from time to time. To update the locators in the test instructions manually, test engineers may need to spend a lot of time debugging and updating the locators. To avoid this, the systems and methods described herein provide a way to automatically find a new locator when a locator of a UI element is changed.

In various embodiments, the system can capture snapshots of UI elements in an application and store the snapshots in a database. A snapshot can be a picture or a graphical image of a UI element. For example, the system can capture the snapshots during an initial process configured to capture snapshots of UI elements before a test is executed. In various embodiments, the system can capture snapshots during an initial test by capturing snapshots of UI elements while the initial test is performed. If during a test the system is unable to locate a particular UI element based on the UI element's locator, the system can retrieve a snapshot of the missing UI element from the database and perform image comparison of the snapshot with UI elements in the UI by comparing the snapshot image with images of the UI elements. In various embodiments, image comparison can be performed in a particular portion of the UI, such as the page of the UI where the missing UI element should be located. In various embodiments, the system can compare the types of the UI elements in the UI to the missing UI element's type to make sure that the types match. For example, if a UI element with an identical or sufficiently similar image to the snapshot is located, which UI element is also of the same type as the missing UI element and is located in the same portion of the UI, then the system can assume that the located UI element is the missing UI element. The locator for the located UI element can be retrieved and the test instructions can be updated by replacing the locator of the missing UI element with the retrieved locator. Hence, in the example of a situation where developers refactor code in a way that changes a UI element's locator without changing the UI element's graphical image, this approach can allow the test to automatically determine the new locator of the UI element based on the snapshot of the UI element.

In various embodiments, the system can capture dimension information of UI elements in an application's UI and store the dimension information in a database. Such dimension information can comprise coordinates of the UI element describing the location of the UI element on a page of the UI, such as the x-coordinate and y-coordinate. In various embodiments, dimension information can comprise physical dimensions of a UI element, such as the height and/or width of the UI element. For example, the system can capture the dimension information during an initial process configured to capture the dimension information before a test is executed. In various embodiments, the system can capture dimension information during an initial test by capturing the dimension information while the initial test is performed. If during a test the system is unable to locate a particular UI element on a page of the UI based on the UI element's locator, the system can retrieve dimension information of the missing UI element from the database and check if a UI element with the same dimension information is present on the same page as the missing UI element. The system can also compare a UI element's type to the missing UI element's type. If a UI element with identical or sufficiently similar dimension information is located, which is also of the same type as the missing UI element, then the system can assume that the located UI element is the missing UI element. The locator for the located UI element can be retrieved and the test instructions can be updated by replacing the locator of the missing UI element with the retrieved locator.

Accordingly, the systems and methods described herein provide an efficient way for software testing that automatically finds the locators of missing UI elements.

As used herein, the term "locator" refers to an identifier that is used to locate a UI element in an application or that tells the test how to find the UI element. A locator can be any unique identifier in the code. For example, the software testing framework Selenium uses the following locators: Identifier, Id, Name, Link, DOM, XPath, CSS, or UI-element.

As used herein, the term "user interface" or "UI" refers to the graphical user interface of an application, including any pages, menus, elements, and any other visual graphic representations appearing on the graphical user interface of a computing device running the application.

As used herein, the term "user interface element" or "UI element" refers to any component of an application's UI. For example, a UI element can be a button, checkbox, radio button, drop-down list, text input box, window, hyperlink, slider, menu, or file-select control.

FIG. 1 illustrates an example of an automated software test system implementing image comparison, in accordance with various embodiments. As illustrated in the example of FIG. 1, the system includes a user interface 100 of an application. The UI 100 includes numerous UI elements, such as UI element 1 101, UI element 2 102, through UI element N 103. An automated test can be carried out on the application to test the application according to predetermined test instructions 104. To find and test certain UI elements in the application, the test instructions can use locators corresponding to the UI elements. For example, locator 1 111 may be used to find UI element 1 101, locator 2 112 may be used to find UI element 2 102, and locator N 113 may be used to find UI element N 103. In various embodiments, the locators can be stored in a database, (e.g., database 110) along with snapshots of the UI elements, the type of the UI element and the like.

A snapshot 107 of UI element 1 101 can be captured. The UI element 1 snapshot 121 can be stored in the database 110. Similarly, snapshots of other UI elements, such as UI element 2 snapshot 122 through UI element N snapshot 123, can be captured and stored in the database 110. In various embodiments, snapshots (e.g., UI element 1 snapshot 121, UI element 2 snapshot 122, through UI element N snapshot 123) can be captured during a test pass. For example, the test instructions 104 can include an instruction to capture the snapshots during an initial test pass which is performed before any other tests of the application are performed. During such a test pass, snapshots of UI elements of the application are captured and stored in the database, along with their locators. In various embodiments, other information about a UI element that is used by the test instructions 104 can also be stored in the database 110, such as the UI element's type (e.g., button, checkbox, radio button, drop-down list, text input box, window, hyperlink, slider, menu, or file-select control).

Once the database has been created, a test instruction may encounter a failure to locate a UI element (e.g., UI element 1 101) by using the UI element's locator (e.g., locator 1 111). For example, such a failure can occur if the application's code was refactored or otherwise modified to change the UI element 1 101 locator and the locator 1 111 used by the test instructions 104 was not correspondingly updated. In various embodiments, to locate the UI element 1 101, the UI element 1 snapshot 121 can be retrieved from the database 110 and an image comparison can be performed between the UI element 1 snapshot 121 and images of UI elements in the UI 100. For example, UI elements in the UI 100 can be identified and the images of the identified UI elements can be compared to the UI element 1 snapshot 121 image one-by-one using image comparison until the UI element 1 101 is located among the UI elements. In various embodiments, image comparison can include any image analysis technique for determining that two images are identical or nearly identical. In other embodiments, image comparison can include image analysis techniques for determining that two images are sufficiently similar, according to predetermined similarity criteria.

In various embodiments, the image comparison can be performed between UI element 1 101 with a certain subset of UI elements in the UI 100. For example, image comparison can be performed between UI element 1 101 and UI elements located within a certain portion of the UI 100, such as a certain page, a certain set of pages, a certain portion of a page, a certain area of a page, etc. For example, if UI element 1 101 was located on a particular page of the UI 100, then image comparison can be performed between the UI element 1 snapshot 121 and images of other UI elements on the same page.

In an embodiment, image comparison can be performed between UI element 1 101 and UI elements with certain characteristics. For example, image comparison can be performed between UI element 1 101 and UI elements that are of the same type. An element type can include any of the following: button, checkbox, radio button, drop-down list, text input box, window, hyperlink, slider, menu, or file-select control. For example, if UI element 1 101 is a button, then image comparison can be performed between UI element 1 101 and UI elements that are also a button.

Accordingly, in various embodiments, if a test encounters a failure to locate UI element 1 101, all UI elements of the same type and on the same page as UI element 1 101 can be identified and image comparison can be performed between the UI element 1 snapshot 121 and images of the identified UI elements.

In various embodiments, after the missing UI element 1 101 is located using image comparison, a new locator for the UI element 1 101 can be read or retrieved. For example, a command can be used to retrieve the locator, such as the command within the testing framework Selenium for reading UI element attributes including locators. The test can be repeated using the new locator instead of the previous locator 1 111. If a failure to locate UI element 1 101 is not encountered during the repetition of the test, then the new locator can replace the previous locator 1 111 in future tests.

Figure 2:
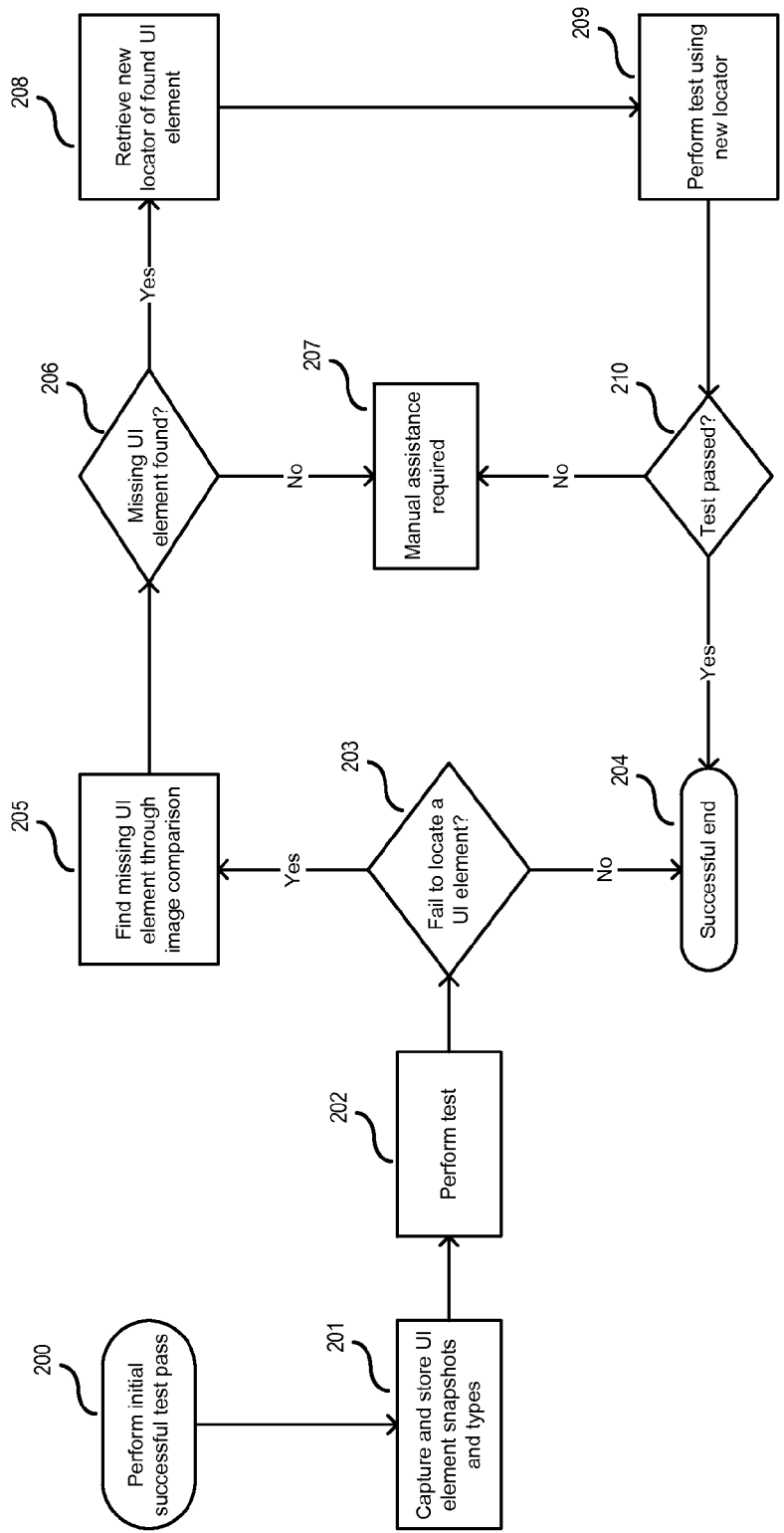
FIG. 2 illustrates an example of a process for automated software testing involving image comparison, in accordance with various embodiments.

FIG. 2 illustrates an example of a process for automated software testing involving image comparison, in accordance with various embodiments. The process can start with performing an initial successful test pass 200 on an application. After a successful initial test pass, the system can capture a snapshot of UI elements used in the test, as well as the type of the UI element, and store the information in a database 201. Subsequently, a test can be performed 202 on the application. If the test does not fail to locate a UI element 203, then the process can reach a successful end 204. If the test fails to locate a UI element 203, then the system can proceed to finding the missing UI element through image comparison 205 based on a snapshot of the missing UI element and based on the missing UI element's type. In various embodiments, the snapshot and the UI element's type can be retrieved from the database, where the information was stored in step 201. For example, the snapshot image can be compared to images of UI elements of the same type as the missing UI element located on the same page as the missing UI element. If the missing UI element is not found 206, then manual assistance can be required 207 to identify and fix the problem. If the missing UI element is found 206, then the system can retrieve a new locator of the found UI element 208. The test can be performed using the new locator 209. If the test is not passed 210, then manual assistance can be required 207 to identify and fix the problem. If the test is passed 210, then the process can reach a successful end 204.

Figure 3:
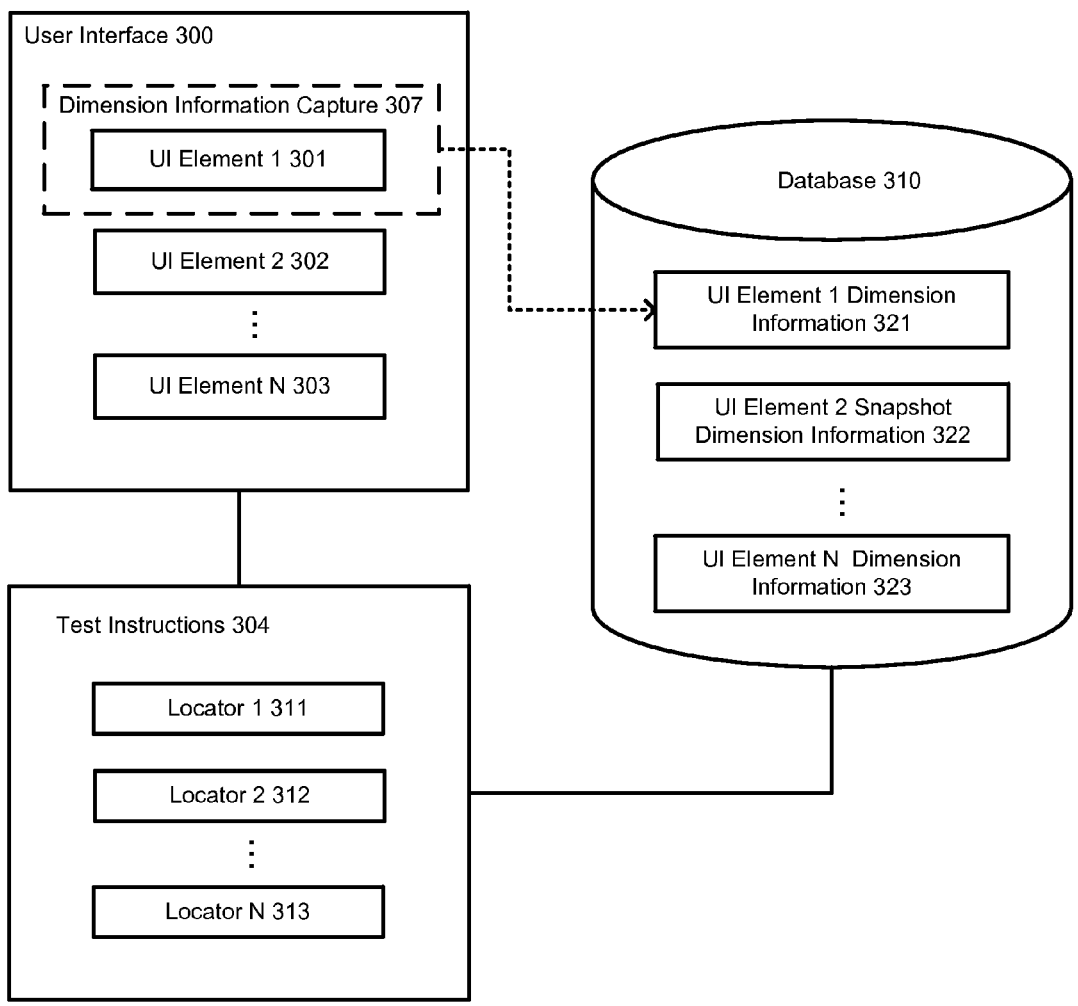
FIG. 3 illustrates an example of an automated software test system implementing dimension information comparison, in accordance with various embodiments.

FIG. 3 illustrates an example of an automated software test system implementing dimension information comparison, in accordance with various embodiments. As illustrated in the example of FIG. 3, the system includes a user interface 300 of an application. The UI 300 includes numerous UI elements, such as UI element 1 301, UI element 2 302, through UI element N 303. An automated test can be carried out on the application to test the application according to predetermined test instructions 304. To find and test certain UI elements in the application, the test instructions use locators corresponding to the UI elements. For example, locator 1 311 may be used to find UI element 1 301, locator 2 312 may be used to find UI element 2 302, and locator N 313 may be used to find UI element N 303. In various embodiments, the locators can be stored in a database, (e.g., database 310) along with dimension information of the UI elements, the type of the UI element and the like.

Dimension information 307 of UI element 1 301 can be captured. In various embodiments, dimension information can be physical dimensions and/or coordinates of a UI element on a page of the UI. For example, physical dimensions of a UI element can be the height and width of a UI element or the shape of a UI element (e.g., circle, oval, certain height to width proportions, and the like.). In various embodiments, coordinates of a UI element can refer to the location of the UI element on a page of the UI, such as the x-coordinate and the y-coordinate of the UI element on the page of the UI.

After dimension information 307 of UI element 1 301 is captured, the UI element 1 dimension information 321 can be stored in the database 310. Similarly, dimension information of other UI elements, such as UI element 3 dimension information 322 through UI element N dimension information 323, can be captured and stored in the database 310. In various embodiments, dimension information (e.g., UI element 1 dimension information 321, UI element 2 dimension information 322, through UI element N dimension information 323) can be captured during a test pass. For example, the test instructions 304 can include an instruction to capture the dimension information during an initial test pass, which is performed before any other tests of the application are performed. During such a test pass, dimension information for UI elements of the application are captured and stored in the database, along with their locators. In various embodiments, other information about a UI element that is used by the test instructions 304 can also be stored in the database 310, such as the UI element's type (e.g., button, checkbox, radio button, drop-down list, text input box, window, hyperlink, slider, menu, or file-select control).

Once the database has been created, a test instruction may encounter a failure to locate a UI element (e.g., UI element 1 301) by using the UI element's locator (e.g., locator 1 311). For example, such a failure can occur if the application's code was refactored or otherwise modified to change the UI element 1 301 locator and the locator 1 311 used by the test instructions 304 was not correspondingly updated. In various embodiments, to locate the UI element 1 301, the UI element 1 dimension information 321 can be retrieved from the database 310 and the missing UI element can be identified based on the retrieved UI element 1 dimension information 321. For example, if the UI element 1 dimension information 321 indicates the coordinates, height, and width of UI element 1 301, then the system can check whether there is a UI element on the same page of the UI 300, with the same coordinates, height, and width. If such a matching UI element is found, then the system can assume that the found UI element is UI element 1 301.

In various embodiments, to locate the UI element 1 301, the UI element 1 dimension information 321 and the UI element 1 301 type can be retrieved from the database 310 and the missing UI element can be identified based on the retrieved UI element 1 dimension information 321 and the UI element 1 301 type. For example, if the UI element 1 dimension information 321 indicates the coordinates, height, and width of UI element 1 301, then the system can check whether there is a UI element on the same page of the UI 300, with the same coordinates, height, width, and type as UI element 1 301. If such a matching UI element is found, then the system can assume that the found UI element is UI element 1 301.

In various embodiments, after the missing UI element 1 301 is located, a new locator for the UI element 1 301 can be read or retrieved. For example, a command can be used to retrieve the locator such as the command within the testing framework Selenium for reading UI element attributes including locators. The test can be repeated using the new locator instead of the previous locator 1 311. If a failure to locate UI element 1 301 is not encountered during the test, then the new locator can replace the previous locator 1 311 in future tests.

Figure 4:
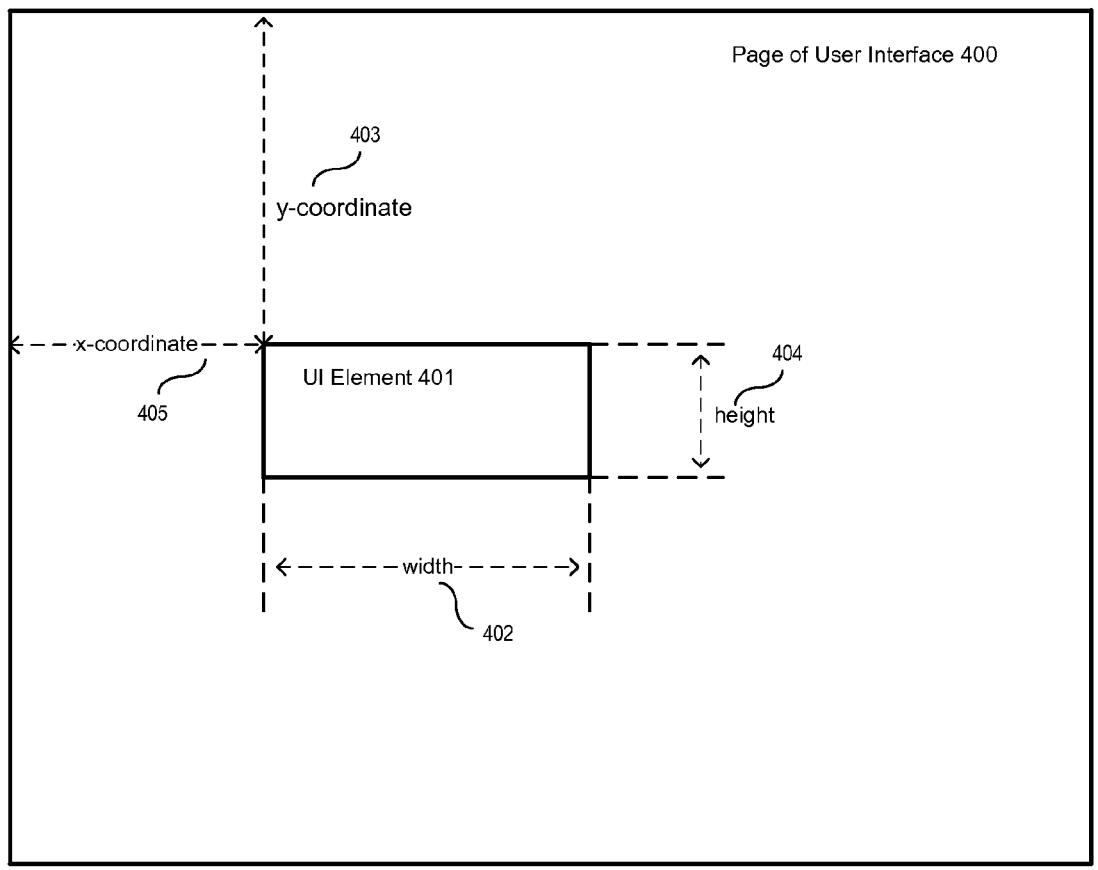
FIG. 4 illustrates an example of UI element dimension information.

FIG. 4 illustrates an example of UI element dimension information. A UI element 401 is located on a page of a user interface 400 of an application. The UI element 401, for example, can be a button. As illustrated, the dimension information of the UI element 401 can include its width 402 representing the distance from its left edge to its right edge, height 404 representing the distance from its bottom edge to its top edge, x-coordinate 405 representing the distance from the left edge of the page to the left edge of the UI element 401, or y-coordinate 403 representing the distance from the top edge of the page to the top edge of the UI element 401.

Figure 5:
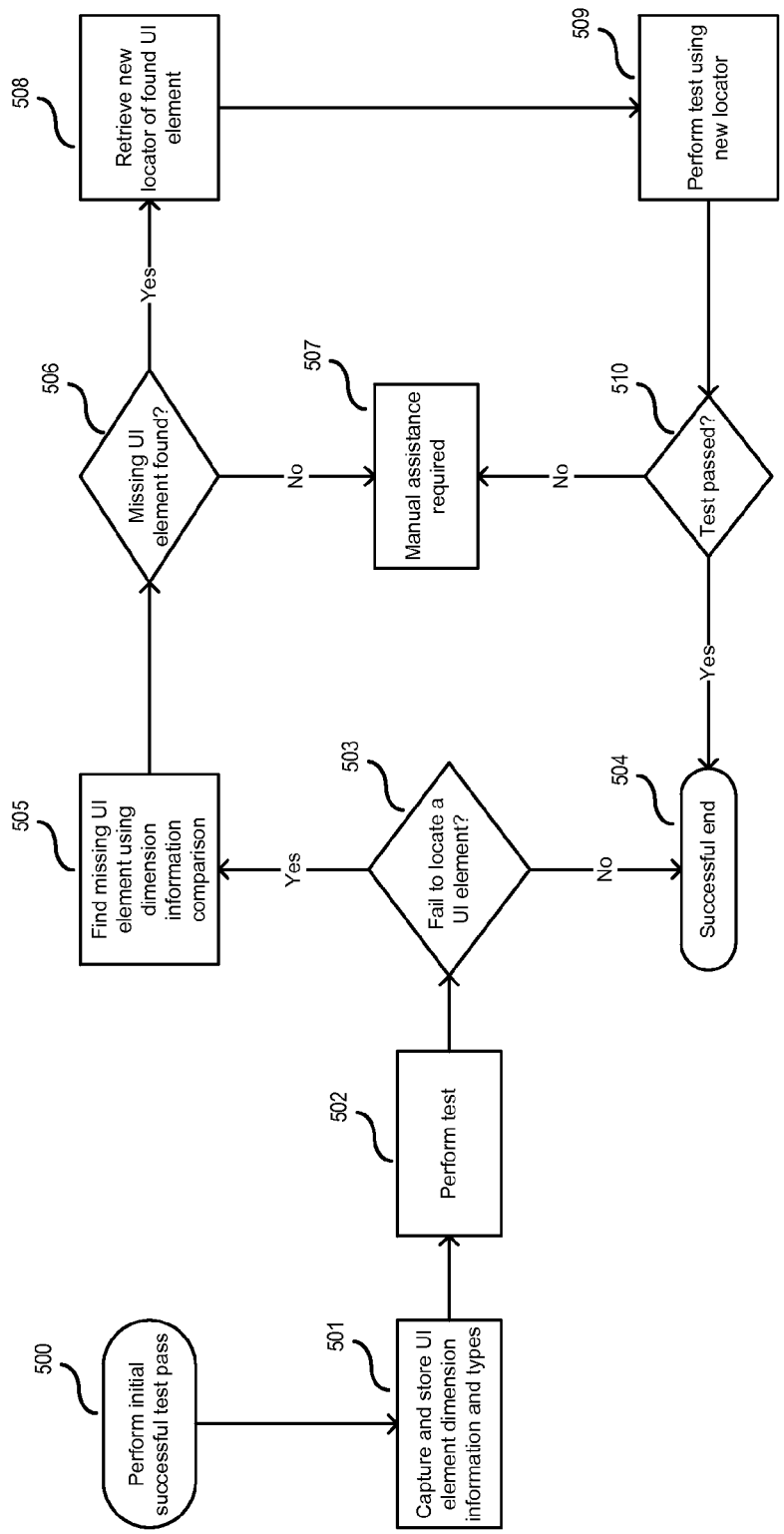
FIG. 5 illustrates an example of a process for automated software testing implementing dimension information comparison, in accordance with various embodiments.

FIG. 5 illustrates an example of a process for automated software testing implementing dimension information comparison, in accordance with various embodiments. The process can start with performing an initial successful test pass 500 on an application. After a successful initial test pass, the system can capture dimension information of UI elements used in the test, as well as the type of the UI element, and store the information in a database 501. Subsequently, a test can be performed 502 on the application. If the test does not fail to locate a UI element 503, then the process can reach a successful end 504. If the test fails to locate a UI element 503, then the system can proceed to finding the missing UI element using dimension information comparison 505 based on the dimension information of the missing UI element and based on the missing UI element's type. In various embodiments, the dimension information and the UI element's type can be retrieved from the database, where the information was stored in step 501. For example, if the missing UI element's dimension information indicates the coordinates, height, and width of the missing UI element, then the system can check whether there is a UI element on the same page of the UI, of the same type as the missing UI element, with the same coordinates, height, width and type as the missing UI element. If such a matching UI element is found, then the system can assume that the found UI element is the missing UI element. If the missing UI element is not found 506, then manual assistance can be required 507 to identify and fix the problem. If the missing UI element is found 506, then the system can retrieve a new locator of the found UI element 508. The test can be performed using the new locator 509. If the test is not passed 510, then manual assistance can be required 507 to identify and fix the problem. If the test is passed 510, then the process can reach a successful end 504.

Figure 6:
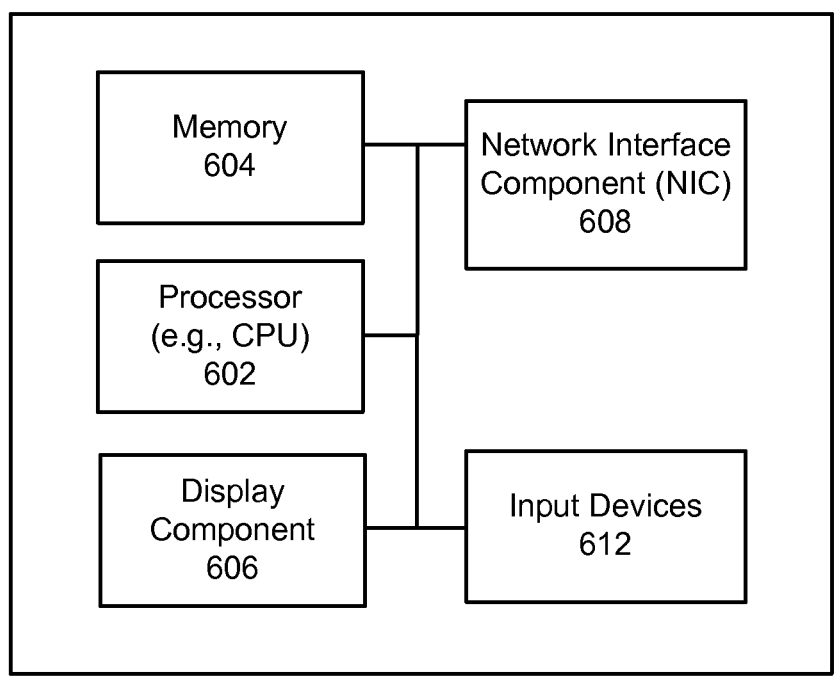
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in physical memory component 604. The memory component 604 can include many types of memory, data storage, or non-transitory computer-readable storage media, such as random access memory (RAM) storing program instructions for execution by the processor 602, a separate form of storage for images or data, a removable memory for sharing information with other devices and the like. The computing device typically can further comprise a display component 606, such as a monitor, a touch screen, liquid crystal display (LCD), or the like. In various embodiments, the computing device will include at least one input device 612 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 608 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for testing software applications, the method comprising:
   identifying a plurality of user interface elements (UI elements) within a user interface (UI) of an application, each UI element having a locator associated therewith;
   capturing a snapshot of each UI element in the plurality of UI elements and storing the snapshots in a database;
   executing a test on the application, the test configured to locate each UI element by using a locator associated with the UI element;
   determining that the test was unable to locate a missing UI element by using a locator associated with the missing UI element, wherein the missing UI element is one of the plurality of UI elements;
   retrieving the snapshot associated with the missing UI element from the database;
   determining a type of the missing UI element;
   locating the missing UI element at a new location within the UI based at least on image comparison of the retrieved snapshot with at least one UI element in the UI, wherein locating the missing UI element within the UI is further based on the type of the missing UI element; and
   updating the locator associated with the located missing UI element to reflect the new location of the missing UI element.

2. The method of claim 1, further comprising, after locating the missing UI element, determining a new locator for the missing UI element.

3. The method of claim 2, further comprising, updating the test such that the missing UI element is associated with the new locator.

4. The method of claim 1, wherein the image comparison of the retrieved snapshot is performed with UI elements located in a portion of the UI, in which portion the missing UI element is located.

5. The method of claim 4, wherein the portion of the UI is a page of the UI, on which page the missing UI element is located.

6. The method of claim 1, further comprising:
   capturing the type of each UI element in the plurality of UI elements and storing the type of each UI element in the database;
   determining the type of the missing UI element based on the database;
   wherein locating the missing UI element within the UI is further based on the missing UI element's type.

7. The method of claim 1, wherein the type of the missing UI element is at least one of a button, checkbox, radio button, drop-down list, text-input box, window, hyperlink, slider, menu, of file-select control.

8. A computing device, comprising:
   at least one processor; and
   memory including instructions that, when executed by the at least one processor, cause the computing device to:
   identify a plurality of user interface elements (UI elements) within a user interface (UI) of an application, each UI element having a locator associated therewith;
   capture a snapshot of each UI element in the plurality of UI elements and store the snapshots in a database;
   execute a test on the application, the test configured to locate each UI element by using a locator associated with the UI element;
   determine that the test was unable to locate a missing UI element by using the locator associated with the missing UI element, wherein the missing UI element is one of the plurality of UI elements;
   retrieve the snapshot associated with the missing UI element from the database;
   determine a type of the missing UI element;
   locate the missing UI element at a new location within the UI based at least on image comparison of the retrieved snapshot with at least one UI element in the UI, wherein locating the missing UI element within the UI is further based on the type of the missing UI element; and
   update the locator associated with the located missing UI element to reflect the new location of the missing UI element.

9. The computing device of claim 8, wherein the memory further includes instructions that when executed by the at least one processor, cause the computing device to:

after locating the missing UI element, determine a new locator for the missing UI element.

10. The computing device of claim 9, wherein the memory further includes instructions that when executed by the at least one processor, cause the computing device to:
update the test such that the missing UI element is associated with the new locator.

11. The computing device of claim 8, wherein the image comparison of the retrieved snapshot is performed with UI elements located in a portion of the UI, in which portion the missing UI element is located.

12. The computing device of claim 11, wherein the portion of the UI is a page of the UI, on which page the missing UI element is located.

13. The computing device of claim 8, wherein the memory further includes instructions that when executed by the at least one processor, cause the computing device to:
capture the type of each UI element in the plurality of UI elements and store the type of each UI element in the database;
determine the type of the missing UI element based on the database;
wherein locating the missing UI element within the UI is further based on the missing UI element's type.

14. The computing device of claim 8, wherein the type of the missing UI element is at least one of a button, checkbox, radio button, drop-down list, text-input box, window, hyperlink, slider, menu, of file-select control.

15. A non-transitory computer readable storage medium comprising one or more sequences of instructions, the instructions when executed by one or more processors causing the one or more processors to execute the operations of:
identifying a plurality of user interface elements (UI elements) within a user interface (UI) of an application, each UI element having a locator associated therewith;
capturing a snapshot of each UI element in the plurality of UI elements and storing the snapshots in a database;
executing a test on the application, the test configured to locate each UI element by using a locator associated with the UI element;
determining that the test was unable to locate a missing UI element by using the locator associated with the missing UI element, wherein the missing UI element is one of the plurality of UI elements;
retrieving the snapshot associated with the missing UI element from the database;
determining a type of the missing UI element;
locating the missing UI element at a new location within the UI based at least on image comparison of the retrieved snapshot with at least one UI element in the UI, wherein locating the missing UI element within the UI is further based on the type of the missing UI element; and
updating the locator associated with the located missing UI element to reflect the new location of the missing UI element.

16. The non-transitory computer readable storage medium of claim 15, further comprising instructions that when executed by the one or more processors cause the one or more processors to execute the operations of:
after locating the missing UI element, determining a new locator for the missing UI element.

17. The non-transitory computer readable storage medium of claim 16, further comprising instructions that when executed by the one or more processors cause the one or more processors to execute the operations of:
updating the test such that the missing UI element is associated with the new locator.

18. The non-transitory computer readable storage medium of claim 15, wherein the image comparison of the retrieved snapshot is performed with UI elements located in a portion of the UI, in which portion the missing UI element is located.

19. The non-transitory computer readable storage medium of claim 18, wherein the portion of the UI is a page of the UI, on which page the missing UI element is located.

20. The non-transitory computer readable storage medium of claim 15, further comprising instructions that when executed by the one or more processors, cause the one or more processors to execute the operations of:
capturing the type of each UI element in the plurality of UI elements and storing the type of each UI element in the database;
determining the type of the missing UI element based on the database;
wherein locating the missing UI element within the UI is further based on the missing UI element's type.

* * * * *